United States Patent [19] [11] 3,723,985

Krupp et al. [45] Mar. 27, 1973

[54] ELECTRICALLY CONTROLLABLE STEERING ARRANGEMENT FOR MAGNETIC SINGLE-WALL DOMAIN PROPAGATION PATHS

[75] Inventors: Roy Stephen Krupp, Rumson; Lawrence Andrew Tomko, Middletown, both of N.J.

[73] Assignee: Bell Telephone Laboratories, Incorporated, Murray Hill, Berkeley Heights, N.J.

[22] Filed: Dec. 27, 1971

[21] Appl. No.: 212,005

[52] U.S. Cl. ........................340/174 TF, 340/174 SR

[51] Int. Cl. ..........................G11c 11/14, G11c 19/00

[58] Field of Search ...................340/174 TF, 174 SR

[56] References Cited

UNITED STATES PATENTS

| | | | |
|---|---|---|---|
| 3,618,054 | 11/1971 | Bonyhard | 340/174 TF |
| 3,530,444 | 9/1970 | Bobeck et al. | 340/174 TF |
| 3,543,255 | 11/1970 | Morrow et al. | 340/174 TF |
| 3,638,208 | 1/1972 | Chow | 340/174 TF |

*Primary Examiner*—Stanley M. Urynowicz, Jr.
*Attorney*—R. J. Guenther et al.

[57] ABSTRACT

An electrically controllable transfer circuit located at the intersection of plural magnetic single-wall domain field access propagation paths is provided with electric current pulses that are differently phased with respect to an in-plane rotating magnetic field for determining the direction of domain propagation through the intersection. A plurality of such path intersections are interconnected to form row and column shift registers of a two-dimensional shift register. All of the transfer circuits are connected to be driven together to realize propagation in two different directions in each field access cycle.

10 Claims, 5 Drawing Figures

ELECTRICALLY CONTROLLABLE STEERING ARRANGEMENT FOR MAGNETIC SINGLE-WALL DOMAIN PROPAGATION PATHS

BACKGROUND OF THE INVENTION

1. Field of the Invention

This invention relates to magnetic single-wall domain propagation and transfer circuits, and it relates particularly to domain propagation arrangements wherein the direction of propagation in intersecting propagation paths is electrically controllable.

2. Description of the Prior Art

A magnetic single-wall domain is a domain which is bounded by a single domain wall closing upon itself and having a geometry unconstrained by the boundary of a sheet in the plane in which the domain is moved. The domain conveniently assumes the shape of a circle and has a stable diameter determined by the material parameters. A bias field of a polarity to contract domains insures movement of domains as stable entities. The Bell System Technical Journal, Vol. XLVI, No. 8, October, 1967, at pages 1,901 et seq. describes the propagation of single-wall-domains in a propagation medium such as a rare earth orthoferrite.

Domains are propagated through the host magnetic material in which they reside, by cyclically varying the pattern of magnetic field concentrations orthogonal to the sheet of the material. In some systems the pattern variation is accomplished by pulsing in different phases multiple discrete electric conductors on the surface of the sheet for shifting the positions of field concentrations induced near the conductors. In other systems, often designated field access systems, the patterns are varied by applying a rotating magnetic field in the plane of the sheet of magnetic material for producing field concentrations at peripheral discontinuities of soft magnetic film overlays deposited on the host magnetic sheet.

Various domain propagation and transfer techniques are known in the magnetic single-wall domain art. Thus, it is known to steer domains in a two-dimensional shift register by driving phase sequence selection in an arrangement where field concentrations are established by plural relatively displaced electric circuits at each register transfer point. It is also known to move magnetic domains by the field access technique in orthogonal intersecting domain propagation paths without interference; but in these arrangements it has not heretofore been possible to switch domains between the intersecting paths. There are also other propagation arrangements in which a selection can be made between one of two branch propagation paths as a function of a magnetic material overlay configuration in combination with rotating field amplitude variations which are indicative of the selected direction. However, the latter system generally has only one input path to supply domains for the plural output paths.

It is, therefore, one object of the present invention to utilize field access techniques to realize steerable domain propagation among plural domain propagation paths.

It is another object to simplify electric circuit requirements for achieving two-dimensional magnetic domain shift register type of domain propagation.

A further object is to select a magnetic domain propagation path in a uniform rotating magnetic field system.

The aforementioned and other objects of the invention are realized in an illustrative embodiment in which at least one intersection of plural, magnetic, single-wall domain, rotating field access, propagation paths is provided with an electric circuit at the intersection. Electric current pulses are provided on the circuit in appropriate phase with respect to the associated rotating magnetic field so that a domain arriving on one path is trapped by the magnetic field associated with the pulse and held at the intersection until the rotating magnetic field is in appropriate phase to propagate the domain, on pulse termination, to a predetermined one of the intersecting paths.

It is one feature of the invention that in each cycle of the rotating magnetic field plural magnetic domains are steered in different phases in different paths through the path intersection.

It is another feature that plural path intersections are combined to form intersecting row and column shift registers of a two-dimensional shift register. Still another feature is that by, appropriate configuration of the electric current pulses, the steering function is made bidirectional as between row and column registers.

BRIEF DESCRIPTION OF THE DRAWING

A more complete understanding of the invention and the various features, objects, and advantages thereof may be obtained from a consideration of the following detailed description in connection with the appended claims and the attached drawing in which:

DETAILED DESCRIPTION

Figure 1:
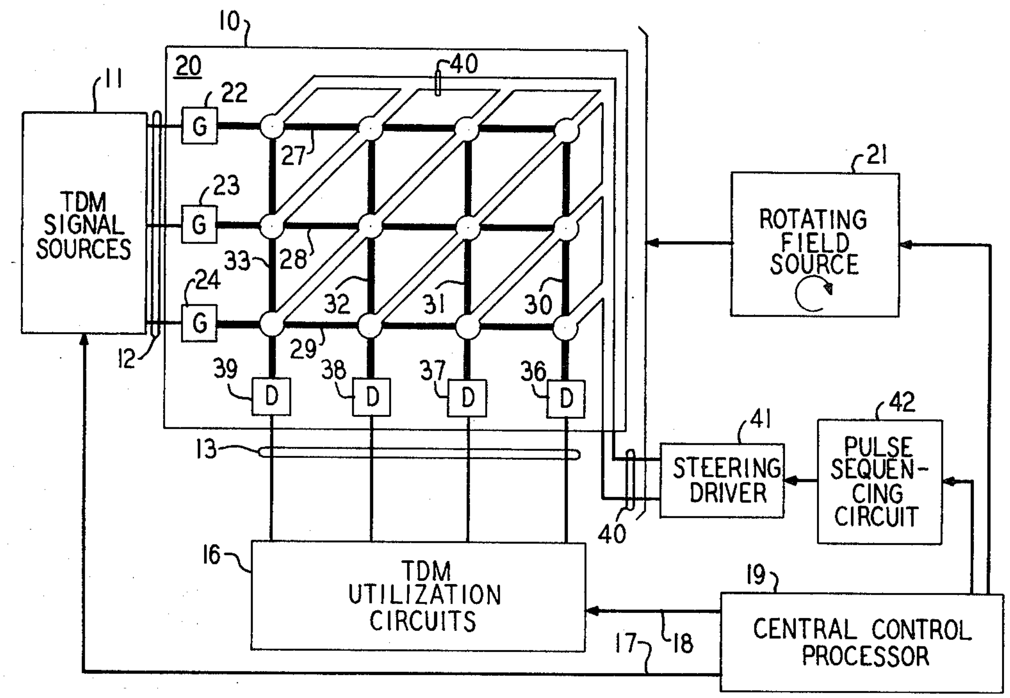
FIG. 1 is a simplified block and line diagram of a mass serial-parallel converter utilizing the invention.

FIG. 1 is a simplified block and line diagram of a time division multiplex communication system utilizing a mass series-parallel converter 10 in accordance with the present invention. A converter of this type receives signal bits in bit-series from each of a plurality of data sources, schematically represented by a block 11, by way of time division multiplex input signal paths, herein called the lines 12. Such signals which were on each of the input lines 12 in a series format are transformed in the converter 10 to a time slot word parallel format on a plurality of converter output lines 13. The output lines are equal in number to the number of time slots per signal frame of input signals on each of the input lines 12. An example of a communication system in which a converter of this type is employed is found in our copending application Ser. No. 212,089, filed on even date herewith, entitled "Time Division Multiplex Switching System Utilizing All Time Division Techniques," and assigned to the same assignee as the present application. The output lines 13 supply their respective signals to time division multiplex utilization circuits 16 which may take any suitable form, including that shown in our aforementioned network application. The sources 11 and circuits 16 are advantageously controlled by signals on circuits 17 and 18 from a central control processor 19 in a fashion which is consistent with the nature of the system in which the converter 10 is employed. Many types of such processor controlled electrical communication systems are known in the art.

The converter of FIG. 1 is implemented in the magnetic single-wall domain technology and comprises a substrate 20 of a magnetic material which is suitable for serving as host to single-wall magnetic domains which have their respective domain walls oriented orthogonally with respect to the substrate surface, all as is now well known in the art. Deposited on the surface of the substrate are soft magnetic film overlays arranged in iterative patterns to define plural domain propagation paths within the substrate 20 and of a type such as are described in an A. H. Bobeck U.S. Pat. No. 3,534,347.

Propagation paths of the type in the Bobeck patent are often called field access propagation paths because they operate in response to a rotating magnetic field which is periodically reoriented in the plane of the substrate 20 to alter magnetic field concentration patterns developed in the substrate beneath peripheral discontinuities in the magnetic overlay elements. Such a rotating field is schematically represented by a rotating field source 21 shown in the drawing for operating under the clock control of processor 19 to apply such a rotating field for reorienting in the clockwise direction in the plane of substrate 20.

Signals supplied from the sources 11 on the input lines 12 are electrically coupled to respective magnetic domain generators 22, 23, and 24 on the substrate 20. These generators are of a type which is well known in the art and which responds to electrical signals in cooperation with an in-plane rotating magnetic field for producing trains of single-wall domains. Such a domain train, when considered in a periodic sense, represents by the presence or absence of domains a corresponding binary coded signal pulse train. Domains produced by the generators are applied to respective domain shift registers 27, 28, and 29 which comprise row shift registers of the converter 10. These registers are schematically represented by broad solid lines in the drawing in order to place them in contrast with the electrical circuits that are indicated by narrow solid lines.

There are also included in the converter 10 four column registers 30, 31, 32, and 33 which are of the same type as the row registers and are arranged on the substrate 20 so that each column register intersects every one of the row registers in a corresponding stage thereof. It is assumed for the purposes of the present disclosure that the aforementioned row and column registers respond to the rotating in-plane magnetic field for propagating domains in the row registers toward the right from the domain generators 22–24 and from top to bottom in the column registers toward a set of domain detectors 36–39. These detectors are also of any appropriate type known in the art which respond to the presence or absence of magnetic single-wall domains at the input thereof from the respective column registers to produce corresponding binary signal representations on the output lines 13.

At the intersections of the row and column registers of converter 10, the magnetic film overlays are absent. Each intersection includes, instead of an overlay element, an electric circuit which is configured so that, upon the application of an electric current pulse to the circuit, an induced field is formed orthogonally with respect to the plane of the substrate 20. This induced field is directed in a sense to attract domains. At each intersection, the circuit 40 assumes a generally circular format somewhat in the nature of either a cul-de-sac or a traffic rotary so that current flowing in the circuit ultimately flows in a circular path about a central area of the intersection. Consequently, within that circular path, the induced magnetic field resulting from the current flow is all in one sense; and that is orthogonal to the substrate 20.

In FIG. 1, the circuit portions at each intersection are assumed to be connected in series with an assumed current flow in the clockwise direction around each intersection so that the induced magnetic field is directed downward into the substrate within the intersection. It is desirable to have the electric current applied at all intersections at the same time. The circular arrangement illustrated in the drawing has all circuit portions connected in series to achieve this end although other connections could, of course, be utilized equally appropriately.

Circuit 40, also interchangeably referred to hereinafter as conductor 40, is energized by current pulses from a domain steering driver 41 which is controlled by a pulse sequencing circuit 42. The latter circuit operates under the control of the central control processor 19 for initiating and terminating electric current pulses in proper phase with respect to the phase of the rotating field supplied by source 21 so that domains propagating along the registers in the converter 10 will be attracted to an adjacent register intersection during a current pulse. Such domains are trapped by the induced field of that pulse until the occurrence of the trailing edge thereof. At the latter time, an attractive field concentration is advantageously present at a different path termination adjacent to the intersection so that a domain in the intersection is released to that path. This type of domain transfer arrangement is considered in greater detail in connection with the overlay diagram of FIG. 2 and the timing phase diagrams of FIGS. 3A–3C.

Figure 2:
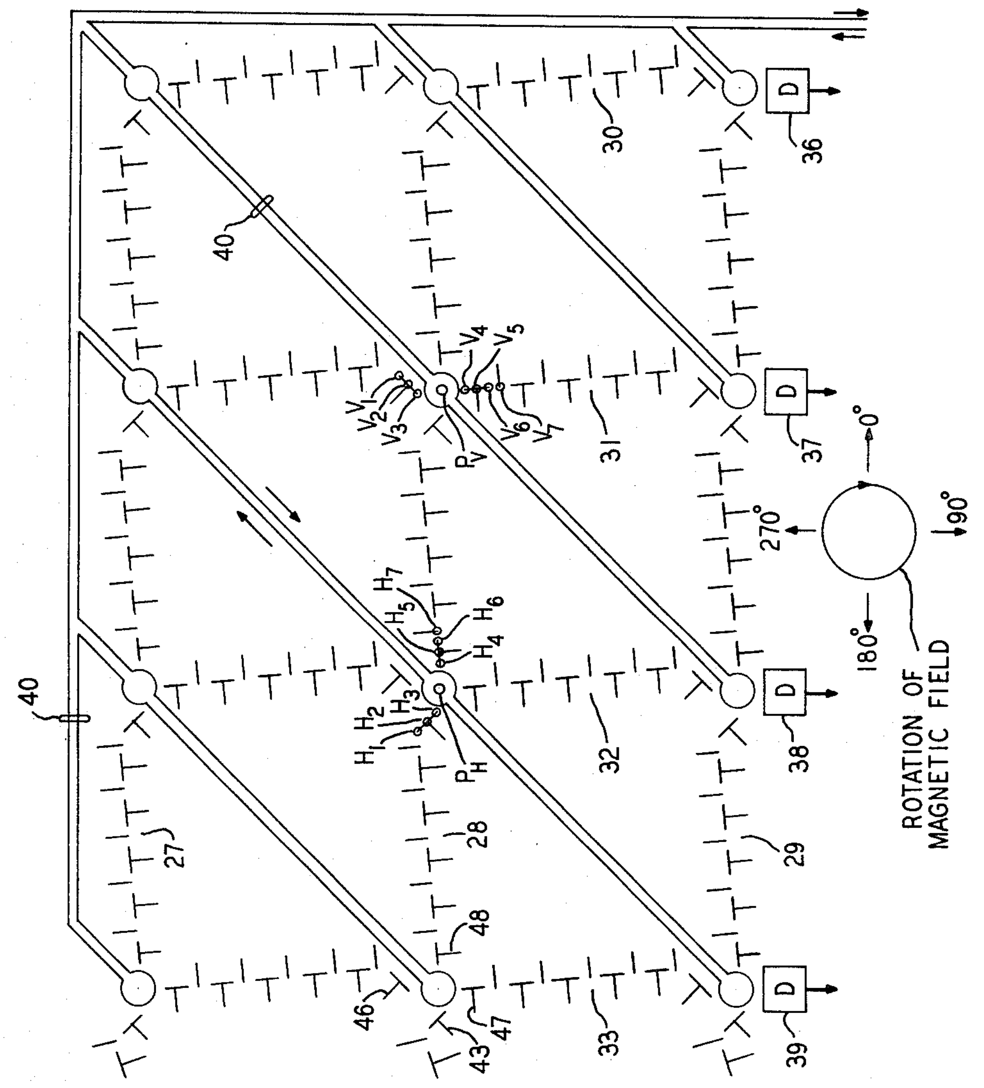
FIG. 2 is a detailed diagram of electric circuit and magnetic material overlays for implementing one form of the converter of FIG. 1.

Referring to FIG. 2, the overlay diagram for the registers of FIG. 1 is illustrated in the usual schematic form for T and bar propagation paths. Register intersections are one time slot word length apart along the respective registers, and each row register advantageously includes a word of additional propagation capacity to the left of intersections with column register 33. Only the registers, the circuit 40, and the detectors 36–39 are shown in FIG. 2. It is also assumed for convenience of drawing presentation in FIG. 2 that the domain detectors respond directly to the outputs from register intersections in the row register 29 at the lower edge of converter 10. Also shown in FIG. 2 adjacent to the converter registers is a circular rotating field diagram for indicating clockwise field rotation and a reference field phase orientation of zero degrees when the resultant rotating magnetic field is directed from left to right.

For the illustrated T and bar register propagation paths in FIG. 2, it will be readily understood that the clockwise in-plane field causes domain propagation from left to right in the row registers and from top to bottom in the column registers as those registers are illustrated in the drawing. Furthermore, it is apparent that each loop of circuit 40 at a register intersection is located in the position which would otherwise be occupied by a bar in the iterative pattern of overlay elements. However, such bar is omitted in the intersection in favor of the electric circuit loop. It will be shown that such loop is operated to produce a domain propagation effect which is somewhat similar to what might be called an omnidirectional propagation element so that the loop can serve multiple propagation paths. Each circuit loop is shown in greatly enlarged form in relation to the sizes of the T and bar elements to facilitate illustration. In practice, the loop diameter is only slightly larger than a domain diameter to allow good coupling with the T elements.

Considering first a single one of the domain transfer arrangements which comprise a domain propagation path intersection in the converter 10, it will be observed with respect to the intersection of row register 28 and column register 32 that four propagation paths can be considered to come together at the intersection. These comprise the portions of registers 28 and 32 which propagate domains into the intersection and the portions of the same registers which propagate domains away from the intersection. Each such path portion has a T overlay as the output or input termination element at the circumference of the intersection as represented by the corresponding circular portion of conductor 40 at that intersection.

Propagation path output T elements, such as the T's 43 and 46 at the intersection of registers 28 and 33, are tilted so that the bar across the top of the shank of each such T, when considered in its normal upright position, extends collinearly with respect to a line tangent to the circular portion of circuit 40 at the intersection. That tangent line is tangent to the circular portion of circuit 40 at a point which would lie on a hypothetically superimposed field phase diagram corresponding to a field orientation which would allow the circuit loop to attract and trap a single-wall domain from the adjacent tip of the bar at the top of the T. Similarly, T elements 47 and 48 are provided as input termination elements for the output propagation path portions of the intersecting registers. The input termination T elements 47 and 48 have their bar portions arranged to be collinear with different diameters of the intersection circle at points on a hypothetically superimposed field phase diagram corresponding to a field orientation that allows the part of the bar adjacent to the intersection to have a field concentration for attracting and holding a domain on termination of a current pulse in the conductor 40. Although the aforementioned tangential and diametrical relationships for the input and output T arrangements are advantageous for operation of orthogonally oriented propagation paths, they are not essential for all transfers that could be performed with a transfer circuit of the type represented by the present invention. In general it is necessary only that the magnetic overlay members be close enough, and so oriented, to allow domain movement into and out of the path intersection at appropriate rotating field phases. Furthermore, although, for convenience of illustration, the drawing shows magnetic and conductive overlay elements spaced from one another, in some embodiments they are advantageously overlapped to a limited extent without permitting the magnetic element to protrude into the circuit-enclosed part of an intersection.

Each shift register propagation path portion between intersections necessarily has an input termination at one end and an output termination at the other end. In order to accommodate the aforementioned T element orientations at the intersections, it has been found advantageous to provide a corresponding tilt to the associated domain propagation path portions. This allows such a path portion to receive domains along a path which is substantially collinear with a diameter of one intersection and to supply domains along a tangent to an adjacent intersection even though the intersections are arranged in an essentially regular row and column array.

Figure 3A:
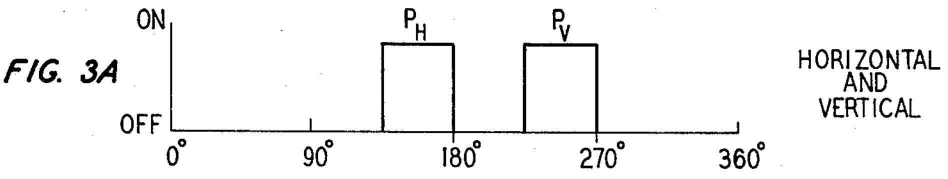
FIGS. 3A through 3C are a family of timing diagrams illustrating phase relations for different types of operation in the converter of FIG. 2.
Figure 3B:
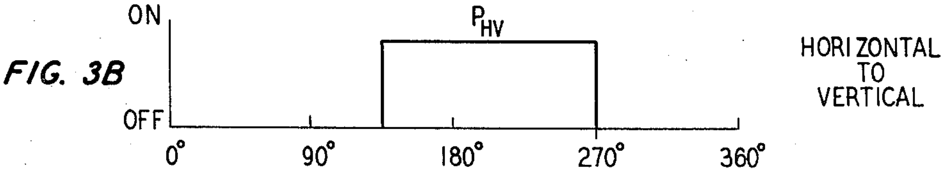
Figure 3C:
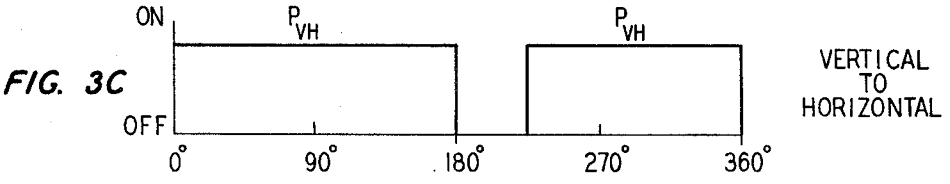

At least three types of domain transfer are possible with the intersection arrangement illustrated in FIG. 3. These three types are represented by the pulse phase diagrams shown in FIGS. 3A–3C wherein current pulse "on" and "off" states are shown with respect to rotating field phases as indicated by the field phase diagram in FIG. 2. The three types of transfer are independent and essentially simultaneous horizontal and vertical transfers of different domains through an intersection, transfer from horizontal to vertical propagation of a single domain through an intersection, and transfer from vertical to horizontal propagation of a single domain through an intersection.

For the first type, noninterfering transfers through each intersection along horizontal and vertical paths, the horizontal transfer is illustrated in FIG. 2 at the intersection of registers 28 and 32; and the vertical transfer is illustrated at the intersection of registers 28 and 31. However, similar transfers occur simultaneously at all intersections where corresponding paths are present and where the signal information pattern includes a domain. Domain locations for consideration in the transfer process are indicated by small separately designated circles on the overlay elements adjacent to the path intersection. Each such location may, in fact, contain a domain at some time or have no domain as the nature of the binary coded information requires. In actual practice, adjacent domain locations where domains could simultaneously be located are, of course, a fully cycle apart in the iterative pattern of overlay elements defining the propagation paths.

If we assume first a horizontal transfer in which a domain is initially located at H1 in the drawing, the rotating field is in the 225° position of the field phase diagram. The domain is propagated to the right in the usual manner. Thus, upon further in-plane field rotation to the 315° position, the domain moves to position H2 at the center of the T element 43 of the intersection under consideration. When the domain has been moved to position H3, the field is at 45°; and the domain is adjacent to the intersection and held in that position by the field concentration at the right-hand tip of the bar on the top of the T element 43. When the field reorients to the 135° position, the aforementioned concentration disappears; and pulse $P_H$ in FIG. 3A is applied to circuit 40. The induced field resulting from this pulse draws the domain from position H3 into the center of the intersection at a position designated $P_H$, the same as the pulse, where the domain is temporarily trapped. Upon rotation of the field to the 180° position, a field concentration appears in a domain location H4 in the left-hand tip of the T element 48 for the intersection under consideration. At this time, the pulse $P_H$ is terminated and the concentration just mentioned draws the domain into the location H4. Thereafter, the domain is propagated in the usual manner through positions H5, H6 and H7 as the rotating field passes through successive phases of 270°, 0° and 90°.

A similar propagation sequence is illustrated at the intersection of registers 28 and 31 for the case of a domain moving in the vertical direction through the latter intersection. Here the domain in question resides initially at the location V1 when the field is in the 315° phase and it moves to position V3 as the field passes through the 45° phase to the 135° phase. At the latter phase, the domain is at the lower tip of the bar on the T element 46 for that intersection and is adjacent to the intersection. During those same phases, it will be recalled, a domain traversing the same intersection in row register 28 passes through the positions H3, $P_H$, and H4 of the intersection; but during such times the column register domain at T element 46 is held out of the path intersection. When the field reaches the phase of 225°, there is no longer a field concentration at location V3, and the pulse $P_V$ is applied to draw the domain from V3 into a position $P_V$ at the center of the intersection. Thereafter, the domain is held in that position until the field reaches the 270° phase position. At the latter time, the pulse $P_V$ is terminated, and the domain is drawn into the location V4 at the top of the bar on the T element 47 for the intersection. In subsequent field phases, the same column register domain moves from position V4 to position V7 in successive steps as is well known for T and bar propagation paths. However, at the same time a new domain in register 28 can pass through the same intersection of registers 28 and 31 as previously outlined.

Each of the aforementioned propagation transfers can take place at every intersection in the converter 10, where appropriately positioned domains are present, in every field rotation cycle as long as the pulses $P_H$, $P_V$ are applied to the conductor 40 during such cycle. Consequently, two domains can be passed through each register intersection in different phases of the same cycle without interference.

In order to steer domains from horizontal propagation paths into vertical propagation paths, the pulses $P_H$ and $P_V$ in FIG. 3A must be replaced by a single pulse $P_{HV}$, as illustrated in FIG. 3B and which extends over the total phase span from 135°–270°. During the pulse $P_{HV}$, a domain passes through the horizontal propagation locations H1, H2, and H3, to the P position in the intersection. However, the domain is not released at the 180° phase position because of the dominating effect of the induced field from the pulse which persists until the 270° phase position. At that time the field concentration at a position corresponding to the V4 domain location at each intersection attracts the domains at the intersections so that they thereafter propagate down the column registers.

It would appear to be possible for a domain residing at a location V3 at the beginning of pulse $P_{HV}$ to be drawn into the intersection at the 225° phase position and either conflict with the row domain previously drawn into the intersection or at least create an ambiguity at the 270° phase time as to the row or column origin of the domain. Such interference or ambiguity does not occur because row registers are loaded in word series until a full frame of signals is contained in each, i.e., until the first bit of the first time slot word of the frame signal in each row is about to enter an intersection with column register 30. Pulses $P_H$ allow such signals to pass straight through intersections without leaving the respective row registers. Then a pulse $P_{HV}$ is provided, in lieu of pulses $P_H$ and $P_V$, from circuit 41 during each bit time of the next time slot to load the column registers in word parallel while a new frame of signals is being supplied to the row registers in their input portions to the left of column register 33. However, domains in a first frame entering intersections from horizontal registers have adequate time to clear the intersections before domains from the new frame start to enter the intersections. When pulses $P_{HV}$ are being applied, there are not domains at the T elements 46 in the column registers because those pulses are applied during only one time slot of a frame and intersections are a time slot word apart in propagation time. During the new frame time, after the old frame bits have cleared the intersections, the $P_{HV}$ pulses are replaced by the $P_H$ and $P_V$ pulses in each bit time. Thus, the row registers are being refilled while the column registers are being emptied.

FIG. 3C illustrates the type of pulses which are applied to conductor 40 in order to steer domains propagating downward in column registers into row registers for propagation to the right. In this case, a pulse $P_{VH}$ is initiated at the 225° field phase position and extends through the 180° phase position of the next field reorienting cycle. Consequently, domains are picked up from the V3 position at the leading edge of pulse $P_{VH}$ and are released to the location H4 at the trailing edge of the pulse $P_{VH}$.

In a system application of a converter of the type just described, the number of input registers in the converter are usually equal to, or less than, the number of output registers. There is, thus, no possibility for interference between row and column blocks of information. If there is a need for a converter to have a greater number of input registers than there are output registers, there arises the possibility that a first frame block of domains will not clear the converter within the time alotted before the entry of a new input frame. To resolve this problem, it is necessary to allow equalizing blank time slots at the end of each input signal frame during which no new information is entered into the rows in order to allow sufficient time for a preceding frame to clear the converter.

Although the invention has been described in connection with a particular embodiment thereof, it is to be understood that additional embodiments, modifications, and applications thereof which will be obvious to those skilled in the art are included within the spirit and scope of the invention.

What is claimed is:

1. In combination, a plurality of field access, magnetic, single-wall domain, propagation paths, at least a first and a second one of said paths intersecting one another, each of said paths including means, comprising a path termination at said intersection, for producing a magnetic field concentration adjacent to said intersection in response to a rotating field and in a phase of said rotating field which is different from the phases at which path termination concentrations are produced for all of the other ones of said paths at said intersection, means, at said intersection and responsive to an electric current, for producing a magnetic field concentration in said intersection for attracting a magnetic domain from a selectable one of said intersecting paths, means for generating a rotating magnetic field in said paths, thereby establishing varying patterns of magnetic field concentrations in said paths for propagating magnetic domains in said paths, and means for applying to said producing means at least one electric current pulse having a leading edge in a first predetermined phase with respect to the phase of said rotating field for attracting a domain propagated under the influence of said rotating field to said intersection, said applying means including means for terminating said current pulse at a second predetermined phase of said rotating field for releasing the attracted domain to another one of said paths under the influence of said rotating field.

2. The combination in accordance with claim 1 in which a plurality of said path intersections are defined by said paths, and means are provided for connecting said producing means of all of said intersections for substantially simultaneous energization by said pulse applying means.

3. The combination in accordance with claim 2 in which said paths include a first group of paths arranged substantially parallel to one another to form a set of row shift registers and a second group of paths arranged substantially parallel to one another to form a set of column shift registers, each shift register of said row set intersects each shift register of said column set one time to form said plurality of path intersections.

4. The combination in accordance with claim 3 in which said producing means and said connecting means comprise electric circuits interconnecting said intersections along diagonals with respect to said row and column sets of shift registers.

5. The combination in accordance with claim 2 in which said connecting means comprises means for connecting all of said producing means in series.

6. The combination in accordance with claim 1 in which said generating means comprises means for generating said rotating field with a substantially uniform resultant magnitude reorienting in a recurrent manner.

7. In combination, a plurality of field access, magnetic, single-wall domain, propagation paths grouped into an input path group and an output path group, at least one of said input paths and one of said output paths intersecting one another, said propagation paths each comprising an iterative pattern of associated T and bar magnetic, field-concentrating, overlay elements upon a substrate member and extending to said intersection, an electric circuit configured for substantially, completely encircling the intersection of said first and second intersecting paths and responsive to a current pulse passed through said circuit to induce a magnetic field having a uniform polarity throughout the encircled portion of said intersection for attracting a magnetic domain from a selectable one of said intersecting paths, each input path to said intersection comprising one of said T elements immediately adjacent to said intersection and having a bar portion and an intersecting shank portion thereof oriented so that the last-mentioned bar portion lies along a tangent to said intersection-encircling circuit and each of said output paths from said intersection comprising a T element having the bar portion thereof extending substantially collinearly with respect to a diameter of said intersection, means for generating a rotating magnetic field in said paths, thereby establishing varying patterns of magnetic field concentrations in said paths for propagating magnetic domains in said paths, and means for applying to said electric circuit at least one electric current pulse having a leading edge in a first predetermined phase with respect to the phase of said rotating field for attracting a domain propagated under the influence of said rotating field to said intersection, said applying means including means for terminating said current pulse at a second predetermined phase of said rotating field for releasing the attracted domain to another one of said paths under the influence of said rotating field.

8. In combination, a plurality of field access, magnetic, single-wall domain, propagation paths, at least a first and a second one of said paths intersecting one another, means, at the intersection of said first and second paths and responsive to an electric current, for producing a magnetic field concentration in said intersection for attracting a magnetic domain from a selectable one of said intersecting paths, means for generating a rotating magnetic field in said paths, thereby establishing varying patterns of magnetic field concentrations in said paths for propagating magnetic domains in said paths, means for applying to said producing means a first pulse having a leading edge which occurs during a rotating field phase in which a first one of said paths includes no attractive field concentration at a termination thereof at said intersection, and such pulse has a trailing edge which occurs at a phase of said rotating field during which a second one of said paths has an attractive field concentration at an input termination thereof at said intersection, and means for applying a second pulse to said producing means, which pulse has a leading edge occurring during a phase of said rotating field when a third one of said propagation paths has no field concentration at an output termination thereof adjacent to said intersection and which has a trailing edge occurring during a phase of said rotating field when a fourth one of said paths has a magnetic field concentration at an input termination thereof adjacent to said intersection.

9. In combination, a plurality of field access, magnetic, single-wall domain, propagation paths, at least a first and a second one of said paths intersecting one another, means, at the intersection of said first and second paths and responsive to an electric current, for producing a magnetic field concentration in said intersection for attracting a magnetic domain from a selectable one of said intersecting paths, means for generating a rotating magnetic field in said paths, thereby establishing varying patterns of magnetic field concentrations in said paths for propagating magnetic domains in said paths, and means operative during a predetermined cycle of said rotating field for applying to said producing means a single electric current pulse having a leading edge which occurs during a phase of said rotating field when a first one of said paths has no field concentration at a path termination adjacent to said intersection, and having a trailing edge which occurs during a phase of said rotating field in which a second one of said paths has a field concentration at an input termination thereof adjacent to said intersection, the last-mentioned phase occurring subsequent to the first-mentioned phase and subsequent to at least one intermediate phase during which at least one other of said paths has an input termination field concentration.

10. The combination in accordance with claim 9 in which said pulse applying means includes means for maintaining said single pulse through field phases during which field concentrations occur at input terminations of all other ones of said paths having terminations at said intersection except one of such paths, and terminating said pulse during the field concentration phase at said one path.

* * * * *